United States Patent [19]

Klein

[11] 4,422,166
[45] Dec. 20, 1983

[54] UNDERSEA SONAR SCANNER CORRELATED WITH AUXILIARY SENSOR TRACE

[75] Inventor: Martin Klein, Salem, N.H.

[73] Assignee: Klein Associates, Inc., Salem, N.H.

[21] Appl. No.: 293,656

[22] Filed: Aug. 17, 1981

[51] Int. Cl.³ .............................................. G01S 15/89
[52] U.S. Cl. .................................... 367/115; 367/106; 340/850
[58] Field of Search ...................... 367/106, 115, 134; 340/850

[56] References Cited

U.S. PATENT DOCUMENTS

| | | | |
|---|---|---|---|
| 2,605,341 | 7/1952 | Vacquier et al. | 340/850 |
| 2,958,280 | 11/1960 | Gilfillan et al. | 340/850 |
| 3,673,552 | 6/1972 | Mross et al. | 367/106 |
| 3,719,920 | 3/1973 | Grada et al. | 367/106 X |
| 4,075,599 | 2/1978 | Kosalos et al. | 367/106 X |

FOREIGN PATENT DOCUMENTS 1315651 5/1973 United Kingdom ................ 367/106

OTHER PUBLICATIONS

Markus, Guidebook of Electronics Circuits, p. 507, 1975.

Primary Examiner—Richard A. Farley
Attorney, Agent, or Firm—Weingarten, Schurgin, Gagnebin & Hayes

[57] ABSTRACT

The output of an auxiliary sensor, such as a magnetometer or metal detector, is recorded along side a sonar trace record, such as from a side scan sonar or sonar sub-bottom profiler, using the same recorder mechanism. In one embodiment, the added information permits correlation on the same chart between sonar generated impressions and local magnetic field disturbances such as produced by magnetically susceptible objects located on or below the seabed. The sonar record is typically provided as a series of adjacent scan lines, intensity modulated in accordance with the intensity of a received sonar echo. A conversion circuit transforms the output of the auxiliary sensor into a format consistent with the sonar scan trace whereby the sensor output is directly reproduced as a part of the sonar trace record, typically at a peripheral edge portion where the sonar image is absent. The auxiliary sensor and sonar detectors are typically located in the same "towfish" which is towed above the bottom being searched by a tending vessel.

15 Claims, 8 Drawing Figures

UNDERSEA SONAR SCANNER CORRELATED WITH AUXILIARY SENSOR TRACE

FIELD OF THE INVENTION

This invention relates to sonar detection and recording apparatus and more particularly, to a method and apparatus for improving identification of undersea objects by permitting correlation between a sonar scan and a magnetometer or metal detector output.

BACKGROUND OF THE INVENTION

In sub-sea surveying, side scan sonars and sub-bottom sonar profilers are towed above the seabottom to produce sonar pictures useful in the identification of seabottom and sub-bottom objects such as pipelines, sunken ships, submarines, mines, torpedos, buoys, and anchoring apparatus. Such sonar systems operate to sonically scan the three-dimensional geography of the bottom and sub-bottom features and produce therefrom a strip chart image resulting from intensity modulating successive marker traces across the paper of a strip chart recorder. The intensity modulation corresponds to received sonar echo intensity and each successive trace represents incremental position of the sonar equipment as it is towed above the bottom. The time between sonar pulse transmission and received echo represents distance to the reflecting object and is mapped into distance on the strip chart by the timed rate of travel of the marking mechanism in successive traces across the chart. Each trace corresponds to a transmitted sonar pulse. There results a photograph like image of the seabottom and its sonar reflecting components.

Such systems are described in the following articles authored by the present inventor, Martin Klein: "New Capabilities for Side Scan Sonar", Oceans '79 IEEE Conference, September, 1979; "Side Scan Sonar", Offshore Services, April, 1979; "Sea Floor Investigations Using Hybrid Analog/Digital Side Scan Sonar", Remote Sensing Conference, Ann Arbor, Mich., April, 1979; "Side Scan Sonar", Undersea Technology, April, 1967.

A cathode ray tube may be substituted for the strip chart recorder to provide much the same graphic representation of seabed features.

While such sonar systems provide a relatively accurate portrayal of the three-dimensional features of the ocean bed, it is oftentimes difficult to identify the nature of articles appearing on the chart. For example, the acoustic energy in a sonar pulse projected towards the ocean bottom may be reflected not only by buried pipelines and other man-made objects, but also by rocks and boulders located beneath the bottom of the ocean. The reflections caused by these naturally occurring geological formations produce traces which approximate those obtained when sonar signals are reflected by the man-made article sought. It would therefore be of advantage to correlate the sonar image with the output of other sensors such as magnetometers which are capable of distinguishing between seabottom rocks and the materials of magnetic susceptibility which often occur in the sought after objects.

Because of the volume of strip chart output in a sonar seabottom search, it would be desirable to have the output of such auxiliary detectors as magnetometers represented directly in graphic form on the strip chart. This, however, is not possible with existing sonar recorder instrumentation because of incompatability of detector output with the format of such recorders which, as noted above, is an intensity modulation of a constant rate of motion marking mechanism. On the other hand the output of the auxiliary sensor is a time varying magnitude which demands that the recorder marking mechanism move under the control of the sensor output magnitude. To provide a trace of the sensor output adjacent to the sonar image would therefore require a separate marking stylus and involve an expensive and inconvenient modification or replacement of the sonar recorders in use today.

SUMMARY OF THE INVENTION

In accordance with the present invention, a system is provided for producing direct recording of the output of an auxiliary sensor along a peripheral portion of a sonar image chart utilizing already existing strip chart recorder instrumentation. The system provides a means for converting the auxiliary sensor output level into a corresponding strip chart mark, the time of occurrence of which corresponds to the amplitude of the sensed parameter. The time varying mark provides a signal format consistent with the marking mechanism of existing sonar image recorders so that the recorder reproduces on the strip chart a waveform corresponding to the auxiliary sensor output.

In particular, the present invention utilizes a sonar recorder in which a marking mechanism makes successive, adjacent tracings across a strip chart at a predetermined rate, with the intensity of the trace mark modulated as a function of the returned sonar echo intensity. The output of an auxiliary sensor, such as a magnetometer or metal detector, useful to distinguish the return echoes of rocks and other sub-bottom debris from desired objects, has its output converted from a signal level corresponding to the amplitude of the sensed parameter to a corresponding time interval for application to the intensity control of the strip chart marking mechanism. The length of the interval is varied in accordance with the magnitude of the sensor output. At the expiration of the interval corresponding to sensor magnitude, a marking pulse is applied to the recorder marking mechanism to produce a clearly visible mark at the appropriate time in the trace across the chart. Typically the interval commences with the beginning of each trace and includes an offset which removes the mark representing the auxiliary sensor signal to a peripheral portion of the sonar trace which will be void of sonar images. The result of repeated tracings by the recorder mechanism across the strip chart is a graphical reproduction of the auxiliary sensor output magnitude correlated precisely in time of occurrence, and therefore position, with the sonar echo signals producing the corresponding seabottom image. In this manner detected seabottom objects can be correlated precisely with auxiliary sensor outputs in order to establish whether the imaged seabottom object possesses magnetic, metallic or other properties. Thus, the location of pipelines on or below the seabed and similar objects can be distinguished from a host of other echo producing features.

Due to the similarity of the operation of raster scan cathode ray tube (CRT) displays which involve repetitive, displaced electron beam sweeps, the present invention may be utilized to drive a CRT display by modulating the beam at the appropriate time in the scan correlated to the amplitude of the sensed parameter.

The sonar system with which the present invention is typically associated may include a side-scan sonar and/or sub-bottom profiler and complimentary strip chart recording apparatus of the type available from the assignee of the present invention, Klein Associates, Inc., Salem, N.H. Such profiling systems can display on a single strip chart the profiles of several sonar detectors, such as a sub-bottom profile and a side scan sonar profile. These are typically combined by using a multichannel recorder. Alternatively, a single channel recorder may be utilized by simultaneously storing in memory the signals from the several sonar detectors and then sequentially retrieving them from memory to give a multichannel appearance to the recorder trace.

The sonar transmitting and detecting equipment typically is included within a hydrodynamically fashioned module commonly termed a towfish which is towed above the sea floor by a search vessel. The magnetometer or other auxiliary detector is conveniently located within the same towfish module. In the case of differential magnetometry, two magnetometers are utilized for differential magnetic field measurement. These are preferably located in one towfish, although they may be located in separate towfish displayed laterally or along the axis of motion from the main towfish.

BRIEF DESCRIPTION OF THE DRAWINGS

These and other features of the present invention may be better understood in connection with the detailed description taken in conjunction with the following drawings of which.

DETAILED DESCRIPTION OF THE DRAWINGS

The present invention contemplates a system for use with side scan sonar and sub-bottom sonar profiling to permit direct recording of the analog or digital output of an auxiliary sensor, such as a magnetometer, metal detector, temperature sensor, pressure transducer, voltage sensor, compass or sound velocity detector adjacent to the recorded sonar image, using the same recorder mechanism.

Figure 1:
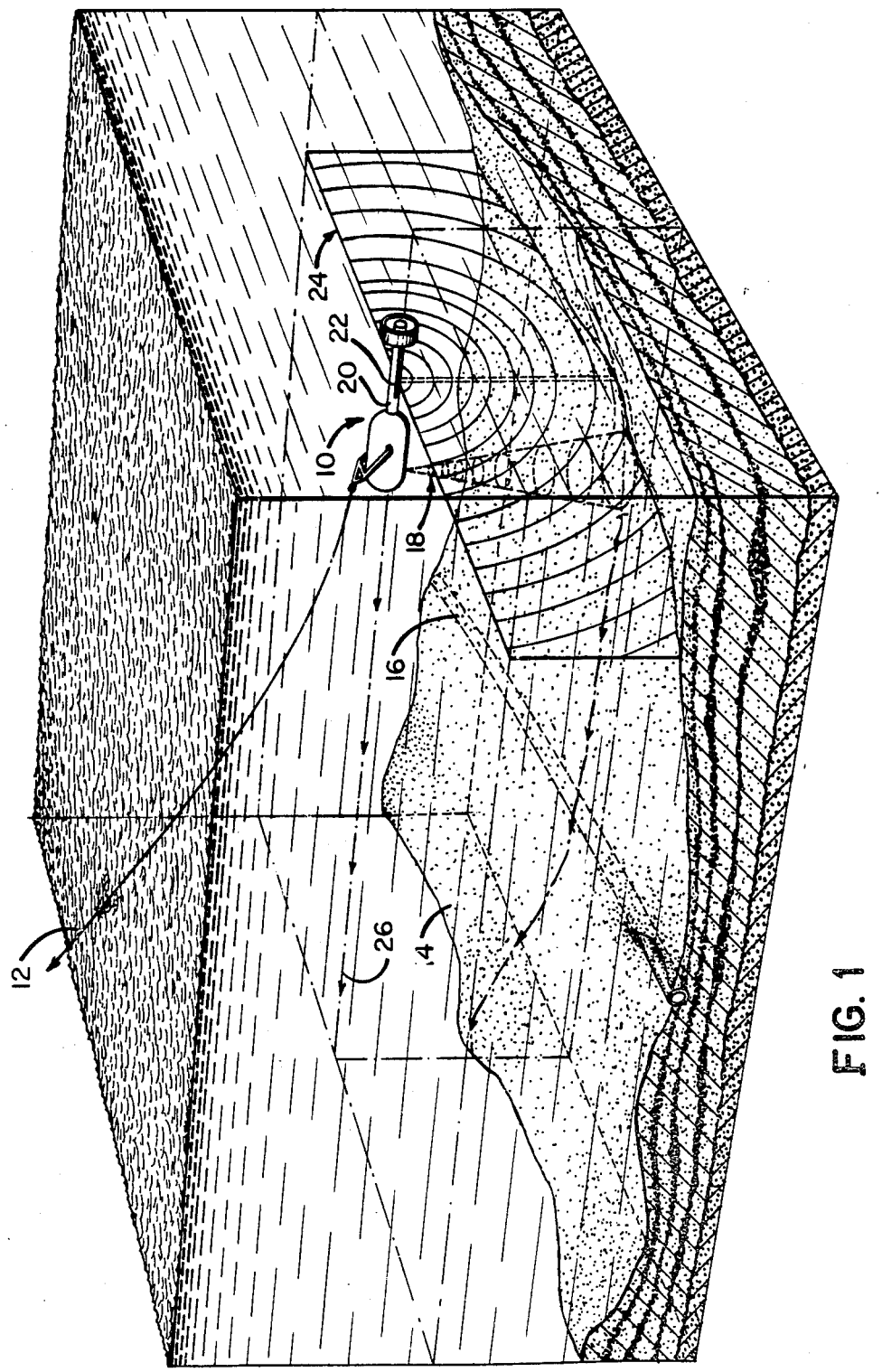
FIG. 1 is a pictorial view of a seabottom region showing a towfish for use in the present invention.

Referring to FIG. 1, such a system typically includes a submersible in the form of a towfish 10 which is towed via a cable 12 above the ocean bottom, here illustrated generally at 14. One purpose of such a system is to detect the presence of an object such as a pipeline 16 which may or may not be buried beneath the seabottom in an unknown location.

The towfish, in one embodiment, is provided with three types of sensors. One type of sensor includes a sub-bottom profiling sonar system in which a transducer radiates a pattern 18 of acoustic energy towards the ocean bottom immediately below the towfish. A second sensor includes a side scan sonar system having transducers 22 located along a cylindrical body extension 20 of towfish 10. The side scan sonar establishes left and right acoustic energy echo sensing patterns 24 transverse to the direction of travel 26 of towfish 10. A third auxiliary sensor is typically located at the rear of the towfish 10. While various types of sensors may be used, for exemplary purposes in the following description, the auxiliary sensor is shown as a magnetometer.

The towfish 10 travels along a given path 26 to cover a predetermined area of the ocean bottom to either side of this path. It is the correlation of the trace produced by the magnetometer with either the sub-bottom profile record or the side scan profile record which permits rapid identification of the nature of bottom or sub-bottom objects.

Figure 2:
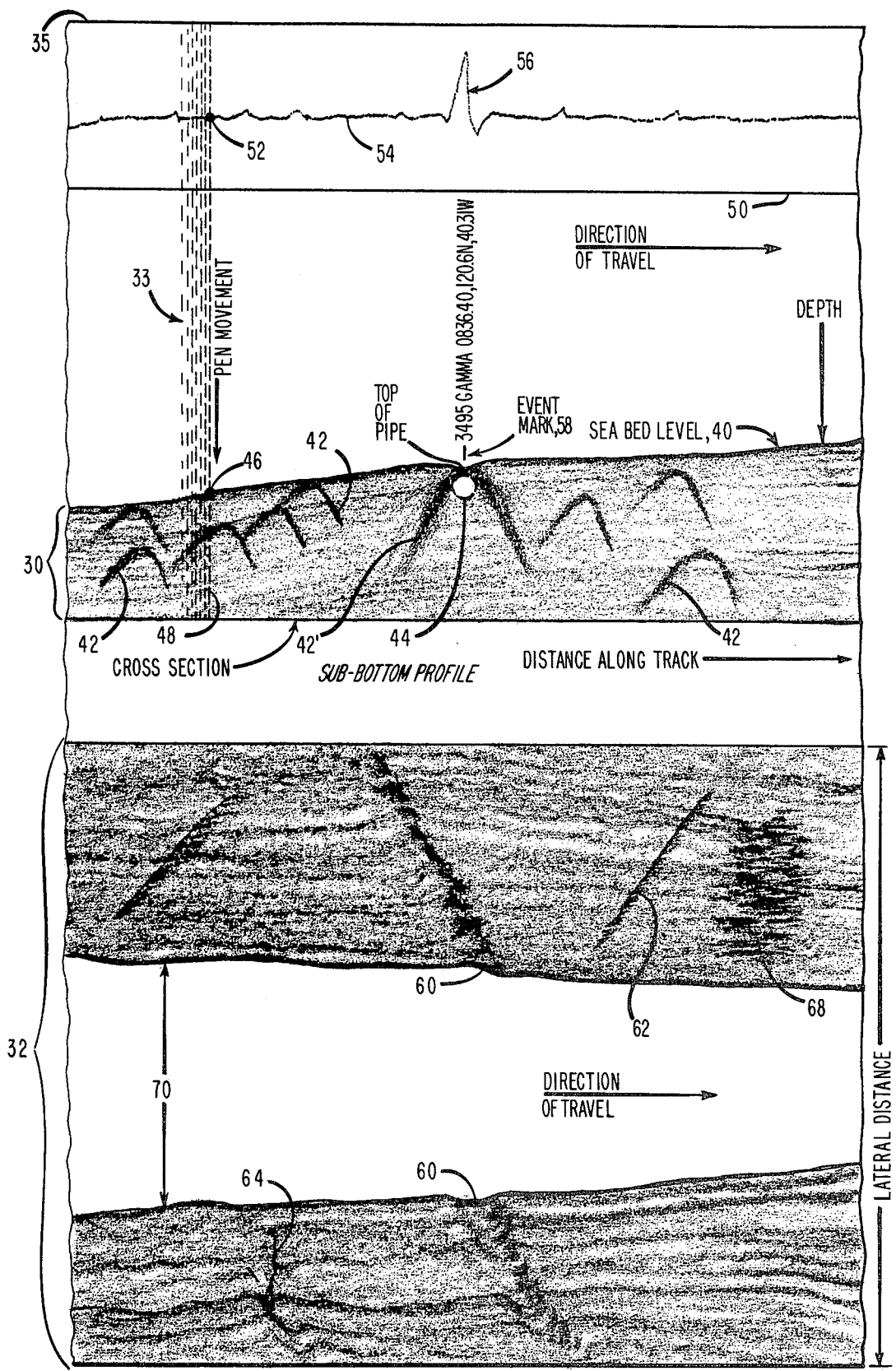
FIG. 2 shows typical strip chart recordings of a sub-bottom sonar profile, and a side scan sonar profile along with a magnetometer output trace produced in accordance with the present invention.

A typical sonar image from such a system is shown in FIG. 2. A record 30, corresponding to a sub-bottom profile, is provided adjacent a recording 32 corresponding to the left and right hand images of a side scan sonar profile taken simultaneously with the sub-bottom profile as the towfish of FIG. 1 proceeds along path 26. The sub-bottom profile 30 shows a vertical zone of the bottom and sub-bottom below the towfish, whereas the side scan profile 32 is taken in a generally horizontal direction.

The sub-bottom profile recording 30, like the side scan sonar profile 32, is produced by intensity modulating a series of adjacent, successive tracings 33 produced by a marking mechanism effectively traveling at a constant rate across a slowly moving strip chart 35. The marker begins each trace at the edge of the chart in timed relation to the commencement of each sonar acoustic pulse from the sub-bottom profiler. The sonar echo return time corresponds to the distance of the echo-producing object from the transducer and the echo magnitude causes a chartmark at the instantaneous marker location, the mark having a corresponding intensity. A typical sub-bottom profile thus produced appears as recording 30 wherein various objects below seabed 40, whether rocks, pipes, etc., appear as hyperbolas 42. The shoulders of the hyperbolas result from echoes that occur when an object is not directly below the sonar transducer. Such objects produce an echo delayed by the extra acoustic distance that increases with object displacement from a location directly below the sonar profiler. The sonar images of diverse bottom or sub-bottom objects will thus show up as hyperbolas of generally similar appearance, masking the presence, for example, of a pipe location 44.

The chart 35 also includes the side scan profile 32 of a side scan sonar system in which the presence of pipe location 44 is illustrated as a bottom perturbation 60 transverse to the direction of travel of the towfish 10. This elongate perturbation, when present, may serve as evidence that that particular region contains a pipe, although the perturbation is consistent with other bottom conditions in which a pipe is not involved such as marks 62, 64 and 68.

Which of the hyperbolas 42 corresponds to pipe location 44 or other sub-bottom object can be more accurately identified by use of an auxiliary sensor. Where the object sought is magnetically susceptible, the magnetometer described provides a useful auxiliary sensor. A typical magnetometer output is illustrated as an analog waveform 54 in FIG. 2. The apparatus, to be described below, according to the present invention permits recording the waveform 54 as a sequence of dotlike marks 52 produced one by one during each of the scans 33. In this manner, the magnetometer signal is recorded directly on the strip chart having the sonar sub-bottom or side scan profiles at a location that correlates positionally with the detected sonar echoes. In this manner a perturbation, such as pulse 56, in the waveform 54 from the auxiliary sensor provides evidence of a distinguishing characteristic of one hyperbola 42' out of many similar ones extending over many meters of chart output. Positional information can also be provided on the chart as shown in an alphanumeric format associated with an event mark 58 for future use in accurately returning the vessel to the location where the pulse occurred.

Figure 3:
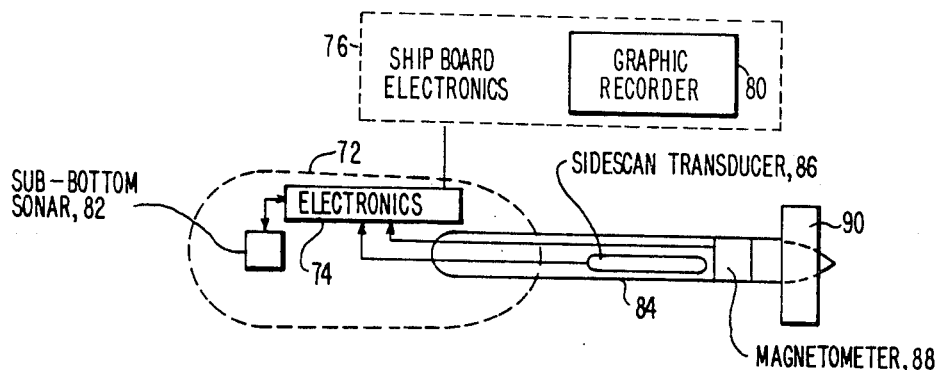
FIG. 3 is a diagram illustrating a sonar towfish with instrumentation including a sub-bottom sonar transducer, side scan sonar transducers and magnetometer for use in the present invention.

With respect now to the apparatus of the present invention, reference is made to FIG. 3 in which the components of the typical towfish having combined sonar and auxiliary sensor detection is illustrated. The towfish typically includes a front housing 72 in which an electronic interface system 74, as known in the art, is operative to provide buffering of signals between the towfish and shipboard electronics 76 to be described herein below. Typically a graphic recorder 80 is provided as a part of the shipboard electronics 76 and is operative to produce the chart 35 of FIG. 2.

The towfish will also typically include within the front housing 72, a sub-bottom sonar transducer 82 of a type known in the art. A typical towfish further includes a cylindrical posterior housing 84 in which side scan sonar transducers 86 are located. To the rear of the side scan sonar transducers 86 is located a magnetometer 88. Both the side scan sonar transducers 86 and magnetometer 88, are elements previously known in the art for independent use and are, like the sub-bottom profile sonar transducer 82, driven by towfish electronics 74 as an interface to the shipboard electronics 76. Stabilizing fins 90 are typically located on the rear most end of the housing 84 as is known in the art.

In the case where the towfish of FIG. 3 includes magnetometer 88 as an auxiliary sensor, the materials contained within the towfish should be substantially of no or low magnetic susceptibility. Since there may be some materials of magnetic susceptibility within the electronics portion 74 or sub-bottom profile transducers, it is convenient to locate the magnetometer 88 as far away as possible in the remote tail portion of the cylindrical housing 84.

Figure 4:
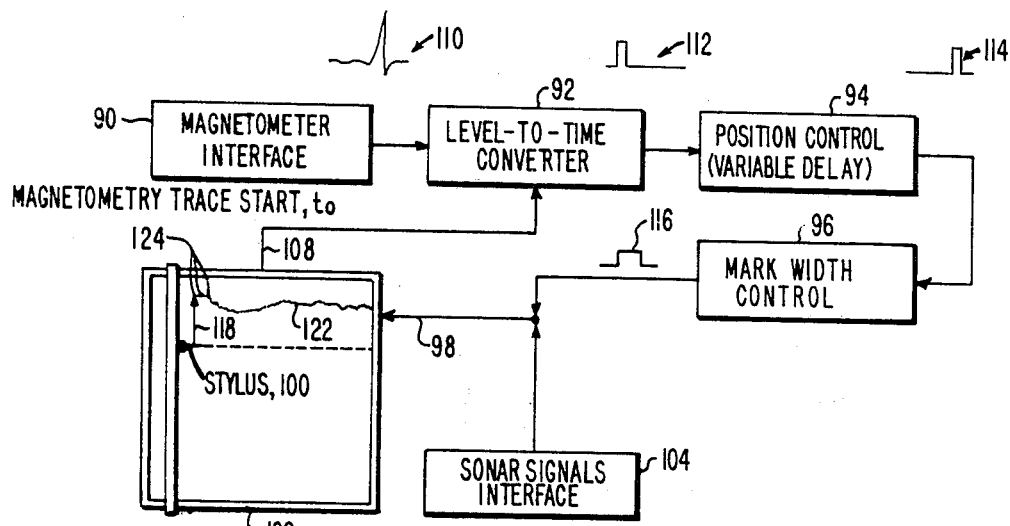
FIG. 4 is a block diagram of circuitry according to the present invention for adapting an analog output for graphic display by the marker mechanism of a constant sweep rate sonar strip chart recorder.

With reference now to FIG. 4, circuitry is illustrated in which the sonar and magnetometer, or other auxiliary sensor, outputs are processed in order to provide the strip chart recording having a sonar image juxtaposed with an analog waveform output from the magnetometer. In particular, a magnetometer interface 90, typically a portion of electronics 74, provides an analog output signal 110, to a shipboard signal level-to-time converter circuit 92. The converter 92 operates to convert an analog signal level from the interface 90 into a time interval, the commencement of which is signaled by a trace start signal from the strip chart recorder 102 over a line 108. The end of the interval is identified as a pulse at the output of the converter 92, such as the pulse 112. The pulse output of the converter 92 is applied to a variable delay circuit 94 which provides a preselected increment to the time interval provided by the converter 92. The variable delay circuit 94 applies a pulse output therefrom a preset time after the occurence of the pulse 92. This signal is applied to a mark width control circuit 96 which establishes a predetermined pulsewidth for the output pulse from the variable delay circuit 94 and in turn applies this pulse of predetermined width to an intensity control input 98 of the strip chart recorder 102. The same intensity input receives the echo sonar signals from interface circuit 104, typically a portion of the electronics 74. A marking stylus 100 of strip chart recorder 102, moving along traces 118 produces an analog trace 122 as a series of dots 124, thereby reproducing the auxiliary sensor output.

Figure 5:
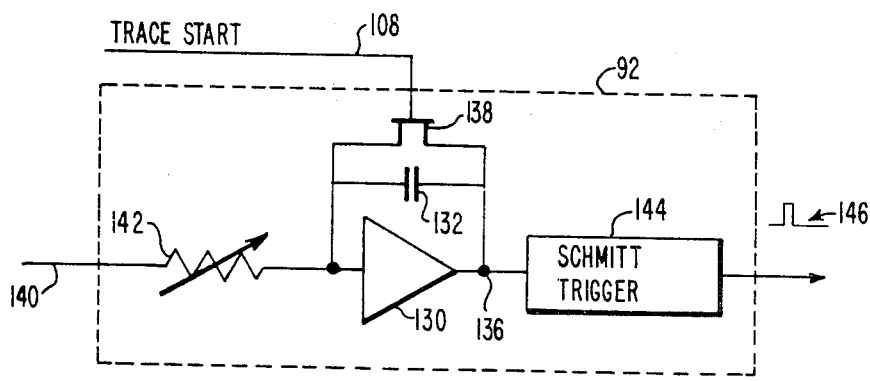
FIG. 5 is a schematic diagram of portions of the circuitry of FIG. 4.

One type of signal level-to-time converter circuit 92 is illustrated in greater detail in FIG. 5 in which the analog signal from the magnetometer interface 90 is applied at 140 through a variable resistor 142 to the input of an operational amplifier 130. The output of the operational amplifier 130 is fed back to the input through a capacitor 132 which is shunted by a field effect transistor 138. The gate control of the field effect transistor 138 responds to the start trace signal from the strip chart recorder 102 on line 108. The output of the operational amplifier 130 is applied to a Schmitt trigger circuit 144.

In the operation of FIGS. 4 and 5, the magnetometer analog output is applied within the converter 92 to the input of the operational amplifier 130. At the commencement of each trace 118 of the recorder 102, the capacitor 132 is discharged by the field effect transistor 138 commencing an integration cycle of the operational amplifier 130, the rate of which is controlled by variable resistor 142, and the magnitude of the input signal from the magnetometer. At a time interval, corresponding to the magnitude of that signal, the integration level from the amplifier 130 will reach the trigger point of the Schmitt trigger 144, producing the pulse 146 corresponding to the output of the converter 92.

The operation of the position control circuit 94 is to add a preset time interval as an offset which permits adjustment of the position of the magnetometer waveform on the chart 35 so that it can be located outside of the image area for the sonar picture. The markwidth control circuit 96 converts the pulse waveform from the circuit 94 into a short, squared pulse of sufficient duration to produce a clearly visible mark. In one embodiment, mark width control circuit 96 is a conventional one-shot multivibrator, the output pulse of which is readily variable and may be preset.

Figure 6:
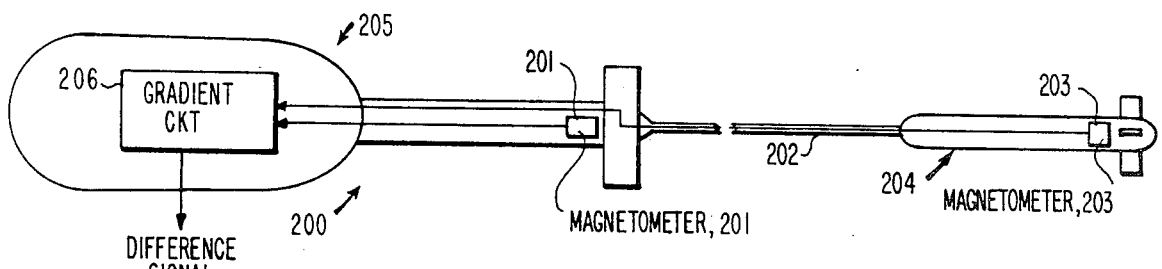
FIG. 6 is a diagram illustrating a towfish modification to include differential magnetometry apparatus.

Referring now to FIG. 6, a modified towfish configuration is shown. A first towfish 200 is provided with a first magnetometer 201. A tow cable 202 connects towfish 200 to a second towfish 204 which carries a second auxiliary sensor, such as a second magnetometer 203. The outputs of these two magnetometers 201 and 203 may be coupled to a conventional gradient circuit 206 in the front housing 205 of towfish 200 to provide a magnetic field difference signal for application to the converter 92.

Figure 7:
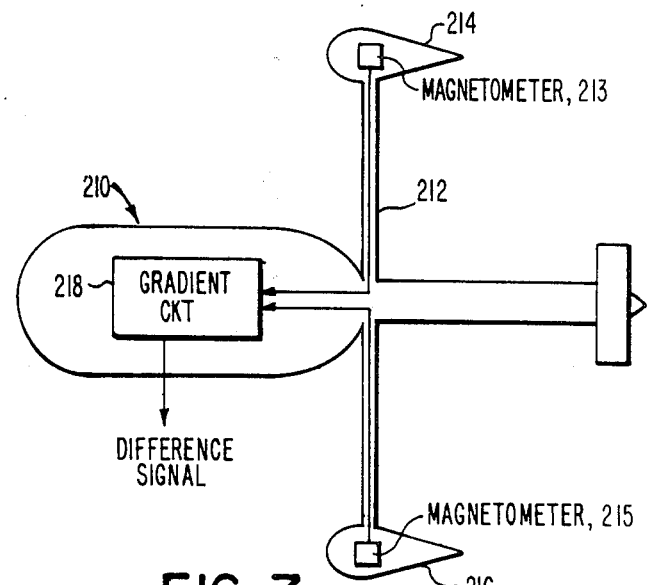
FIG. 7 is a diagram illustrating a further towfish modification to include differential magnetometry apparatus.

Referring to FIG. 7, a further modification of the towfish is shown. A towfish 210 is provided with a transverse boom 212, either horizontal or vertical, at either end of which are located respective magnetometers 213 and 215 in faired pods 214 and 216. The outputs of these magnetometers 213 and 215 may be applied to a conventional gradient circuit 218 in housing 210 so as to provide a similar differential signal.

Figure 8:
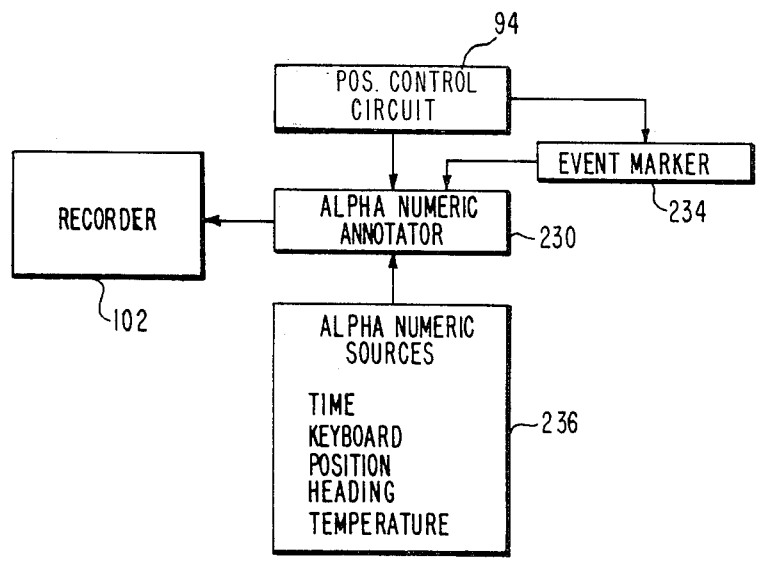
FIG. 8 is a block diagram of circuitry for use in the present invention to provide event marking and alphanumeric annotation on a sonar strip chart recorder.

Referring to FIG. 8, a system is shown in which alphanumeric indicia may be applied to the sonar recording. For this purpose, an alphanumeric annotator 230 is coupled to recorder 102 with the annotator having inputs from the position control circuit 94 and an event marker 234. Event marker 234, in one embodiment, includes a threshold detector which detects when the output of the magnetometer exceeds a predetermined level corresponding to a predetermined magnetic field perturbation. Alternatively, event marker 234 may be set to establish a predetermined threshold level for any auxiliary sensor signal the amplitude of which is monitored.

Another input to the alphanumeric annotator is from a set of alphanumeric sources 236 including a keyboard, clock, or position computer. From these, indicia of time, position, heading, temperature and other manually entered data are available. It will be appreciated that the magnitude of the magnetic anomaly may be imprinted on the sonar recording adjacent the particular marker sweep involved, in an area of the recording where sonar echo returns are not normally expected. Thus, referring back to FIG. 2, and more particularly to the sub-bottom profile 30, an event mark 58 is placed in the region of the chart corresponding to the area between the ocean bottom and the surface of the ocean, with an event mark line being placed along the vertical marker movement axis corresponding to the sensor peak 56. Corresponding data in alphanumeric form is provided there as well. The apparatus for providing the event and alphanumeric indicia is known in the art and available commercially from the assignee, Klein Associates, Inc.

What has therefore been provided is a system for enhancing the ability to recognize predetermined object characteristics either at the ocean bottom or beneath the ocean bed through the utilization of sonar trace augmentation by the direct addition of a waveform from an auxiliary sensor. The analog functions described above can be accomplished digitally, such as by the use of counters for providing delay intervals. The output of the magnetometer or other auxiliary sensor may be digital as well.

Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. A method for identification of undersea metallic objects comprising the steps of:
    providing an intensity modulated pictorial sonar echo record of sea bottom features with a scanning marker in response to a sonar signal from a sonar transducer;
    positionally associating a metal detector with said transducer;
    receiving an output signal from said metal detector associated with said transducer;
    converting the magnitude of the metal detector output signal to a pulse occurring at a time referenced to the start of scan of said marker; and
    activating said scanning marker with said pulse to provide a segregated record of the metal detector output adjacent to and positionally independent from the sonar echo intensity record on a single scanning marker.

2. The method of claim 1 wherein the receiving step includes the step of sensing local magnetic field with a magnetometer to provide said metal detector output signal.

3. The method of claims 1 or 2 wherein said converting step includes the step of integrating said metal detector output signal to a predetermined signal level with occurence marks the end of said time interval.

4. The methods of claim 1 or 2 further including the step of marking said record with an event mark, time data, navigation data, or temperature data.

5. The method of claim 2 wherein said magnetic field sensing step includes differentially sensing the magnetic field.

6. A method for displaying multiformat information comprising:
    providing an intensity modulated sonar record on a scanning marker, said record including a sequence of adjacent scan lines traced at a predetermined rate across a chart with the intensity of the scan lines modulated in accordance with a first signal produced by a sonar transducer;
    converting a second signal magnitude corresponding to a metal detector output signal to a time interval referenced from the start of scan, the length of which corresponds to the second signal magnitude; and
    producing a mark in said adjacent scan lines adjacent said sonar record and segregated from said sonar record during the tracing thereof and at a time varying with said time interval on said scanning marker.

7. Apparatus for identification of undersea metallic objects comprising:
    a sonar transducer;
    means for providing an intensity modulated pictorial sonar echo record including a scanning marker operative in response to a sonar signal from said sonar tranducer;
    a metal detector positionally disposed adjacent said transducer having an output signal of varying magnitude;
    means for converting the magnitude of said metal detector output signal to a corresponding time interval; and
    means for activating said scanning marker at a time varying with said time interval and referenced from the start of each trace of said scanning marker to provide a trace representative of the magnitude of the metal detector output signal adjacent to and segregated from the sonar echo intensity record.

8. The apparatus of claim 7 including means for sensing local magnetic field to provide said metal detector signal.

9. The apparatus of claims 7 or 8 wherein said transducer is a sub-bottom sonar profiler and said record providing means includes means for providing a sub-bottom sonar profile record.

10. The apparatus of claims 7 or 8 wherein said transducer is a side scan sonar transducer and said record providing means includes means for providing a side scan sonar profile record.

11. The apparatus of claims 7 or 8 wherein said converting means includes means for integrating said metal detector output signal to a predetermined signal level and means for terminating said time interval at said level.

12. The apparatus of claims 7 or 8 including a unitary towfish and means for providing both said sonar echo signal and said metal detector output signal from said unitary towfish.

13. The apparatus of claims 7 or 8 further including means marking said record with indicia comprising an event mark, time data, navigation data or temperature data.

14. The apparatus of claim 8 wherein said magnetic field sensing means includes means for differentially sensing the magnetic field.

15. An apparatus for displaying multiformat information for identification of undersea metallic objects comprising:

means for providing a two-dimensional intensity modulated pictorial record including a sequence of adjacent scan lines traced at a predetermined rate across a chart of a scanning marker with the intensity of the scan lines modulated in accordance with a first signal produced by a sonar transducer;

means for converting a second signal magnitude corresponding to an output signal from a metal detector to a time interval referenced from the start of scan line trace across said scanning marker, the length of which corresponds to the second signal magnitude; and means for producing a mark in said adjacent scan lines during the tracing thereof on said scanning marker and at a time varying with said time interval to provide a record of the magnitude of said metal detector output signal adjacent to and segregated from said sonar transducer record.

* * * * *